United States Patent [19]
Ferraiolo et al.

[11] Patent Number: 5,968,137
[45] Date of Patent: Oct. 19, 1999

[54] METHOD OF TESTING A PROTOCOL CONVERTER WITH THE HELP OF AN IDENTICAL CONVERTER AND DEACTIVATING SELECTION MEANS FOR PREVENTING ASYMMETRY CONVERSION

[75] Inventors: Frank D. Ferraiolo, Essex Junction, Vt.; Don T. Gottstine, Tillson, N.Y.; Jürgen Häss, Schönaich, Germany; Joseph B. Hanley, Patterson, N.Y.; Thomas H. Hillock, Woodstock, N.Y.; Donald Jung, Wappingers Falls, N.Y.

[73] Assignee: International Business Machines Corporation, Armonk, N.Y.

[21] Appl. No.: 08/906,173

[22] Filed: Aug. 4, 1997

[30] Foreign Application Priority Data

Aug. 2, 1996 [DE] Germany ............................ 196 31 289

[51] Int. Cl.$^6$ .................................................. H03M 7/30
[52] U.S. Cl. .................................... 710/5; 710/11; 341/4; 341/75; 341/76; 341/78

[58] Field of Search .......................... 710/5, 11; 709/230; 341/4, 75, 76, 78

[56] References Cited

U.S. PATENT DOCUMENTS

| 4,266,292 | 5/1981 | Regan et al. ............................. 370/242 |
| 4,280,285 | 7/1981 | Haas .......................................... 434/30 |
| 5,410,548 | 4/1995 | Millman .................................... 371/23 |
| 5,748,642 | 5/1998 | Lesmeister ............................. 371/22.1 |
| 5,809,040 | 9/1998 | Dallmann et al. ..................... 371/25.1 |
| 5,857,258 | 1/1999 | Penzes et al. .............................. 29/846 |

*Primary Examiner*—Thomas C. Lee
*Assistant Examiner*—Harold Kim
*Attorney, Agent, or Firm*—Marc A. Ehrlich

[57] ABSTRACT

A method for testing protocol converters is presented, which permits the achievement of a test of all commands, independently of a corresponding test system. A modified protocol converter itself is used for the test. With the help of this method, a test for conversion of data structures can be carried out, of a slow protocol into the corresponding data structures of a fast protocol in the original speed.

11 Claims, 7 Drawing Sheets

METHOD OF TESTING A PROTOCOL CONVERTER WITH THE HELP OF AN IDENTICAL CONVERTER AND DEACTIVATING SELECTION MEANS FOR PREVENTING ASYMMETRY CONVERSION

FIELD OF THE INVENTION

The submitted invention relates to general data exchange protocols and a protocol converter. It particularly relates to a method of testing such protocol converters, as well as a specially adapted protocol converter.

BACKGROUND OF THE INVENTION

Data exchange protocols (generally named protocols), represent a set of formal rules which describe how data can be transferred, particularly within networks. Thus protocols which occupy themselves with monitoring electrical and physical standards, arrangement of bits and bytes, as well as the transmission, establishment of errors and definition of the correction of a bit current, are defined as so-called "low-level" protocols. "High-level" protocols occupy themselves with formatting the data including the syntax of the signals, dialogue between terminal and computer, character sets, the sequence control system of signals, etc.

A protocol converter consists of a device or a programme which serves the same purposes, between translating different, non-identical protocols. Thus data structures of a protocol A are converted in a corresponding data structure into the other protocol B. Especially in computer systems, the data are thereby transported over bus lines.

The increasing processing speeds of computer systems resulting in the necessity of improvement of data transmission to peripheral equipment, sets high requirements to the protocol converter, which has to be incorporated in the data circuit between computer system and peripherals. Problems then arise if available slow input-/output (I/O)-systems must be adapted to newly developed, optimized, faster bus systems.

This generally occurs by means of special semi-conductor modules, so-called Bridge-Chips, which undertake the conversion of a slow protocol A into the fast protocol B.

In order to make certain that the newly developed protocol converters also function free of faults, it is necessary to test them before actual use, and if necessary rectify any defects and imperfections thus arising. Normally for this purpose, a test run is undertaken with a test software, in order to determine whether the new converter translates all data correctly. The data in the faster protocol B must therefore be generated (Bringup) from the conventional I/O test data. A protocol partner for the fast protocol B is therefore necessary (Bringup-Adapter), which prepares the test data for the new converter. For example, this can be a new faster computer system.

From the purpose of inserting the converter it arises that specified commands go in the one transmission direction (e.g. from the memory to the peripheral equipment) and are meaningful, but however not in the reverse direction. On this account, selection means are provided in many protocol converters to ensure that such commands which run in the "wrong" direction, are additionally suppressed, in order to guarantee a higher operational safety. This results in an intentionally implemented asymmetry in the protocol conversion between both protocols.

Typically, a test of the converter is first carried out, if the complete new system is ready for operation, and only then can the new chips be tested inside their normal ready for operation environment. If the complete system is however not yet available, the new converter should be tested independently of the corresponding system, and thus, as has already been indicated above, an external Bringup Adapter is required for the test data.

A possibility of achieving such a Bringup, is the design of a special environment by specially developed test environment chips which generate the test data of new faster protocols. This however has the disadvantage that additional chips must be manufactured, giving rise to correspondingly higher costs.

Another possibility exists in reconstructing the Bridge-Chip with primitive, slow and free-programmable logic modules, in order then to test them with the corresponding test programmes. This method is however costly. In addition, the primitive Bridge-Chip is slow, so that on this account, no kind of test can be carried out at the original speed.

A further possibility of testing an already designed protocol converter, consists of a software simulation of the converter for use to test the correct functionality. The preparation of such a simulation is already mainly necessary for the development process of the chip. Test data in the one protocol is fed in for testing the simulation protocol. The simulation protocol translates this output data into the second protocol, and the data thus resulting can be checked for its correctness.

SUMMARY OF THE INVENTION

Here also a test in the original speed of the converter is not possible, so that errors occur, especially at a high transmission speed in actual insertion, which cannot be detected before insertion by this test method.

It is therefore the target of the submitted invention, to make available a test method for a protocol converter, which permits a favourably costed newly developed protocol converter to be tested efficiently, without a great additional expenditure on design.

This target is achieved with the test method according to claim 1 and the protocol converter according to claim 9.

Further advantageous arrangements of the method according to the invention, are contained in the sub-claims.

The method according to the invention permits a second protocol converter to be tested with the help of a first, identical, but however, "mirror-image" inserted protocol converter. The second protocol converter serves to Bringup the required test data in this "reversed" operation. In this Bring-up mode of the protocol converter it is necessary to deactivate the special commands for selection means available for suppression, whereby a balancing of the protocol conversion is achieved. Thereby in this mode, a complete Bringup of all commands can be achieved.

In this way therefore, the modified protocol converter itself can be used for its own test. This has the advantage that the BridgeChip operates with exactly the same speed as the protocol to be tested, and so a test can be carried out in the original speed.

A further advantage consists in that however complex the converter is constructed, and however fast it operates, a test device stands available, inclusive as it were.

Furthermore there is an advantage that the interfaces already coincide, and no further difficult adaption procedures are necessary any more.

The invention is explained more closely by means of the diagrams. They show

DETAILED DESCRIPTION OF THE PREFERRED EMBODIMENT OF THE INVENTION

Figure 1:
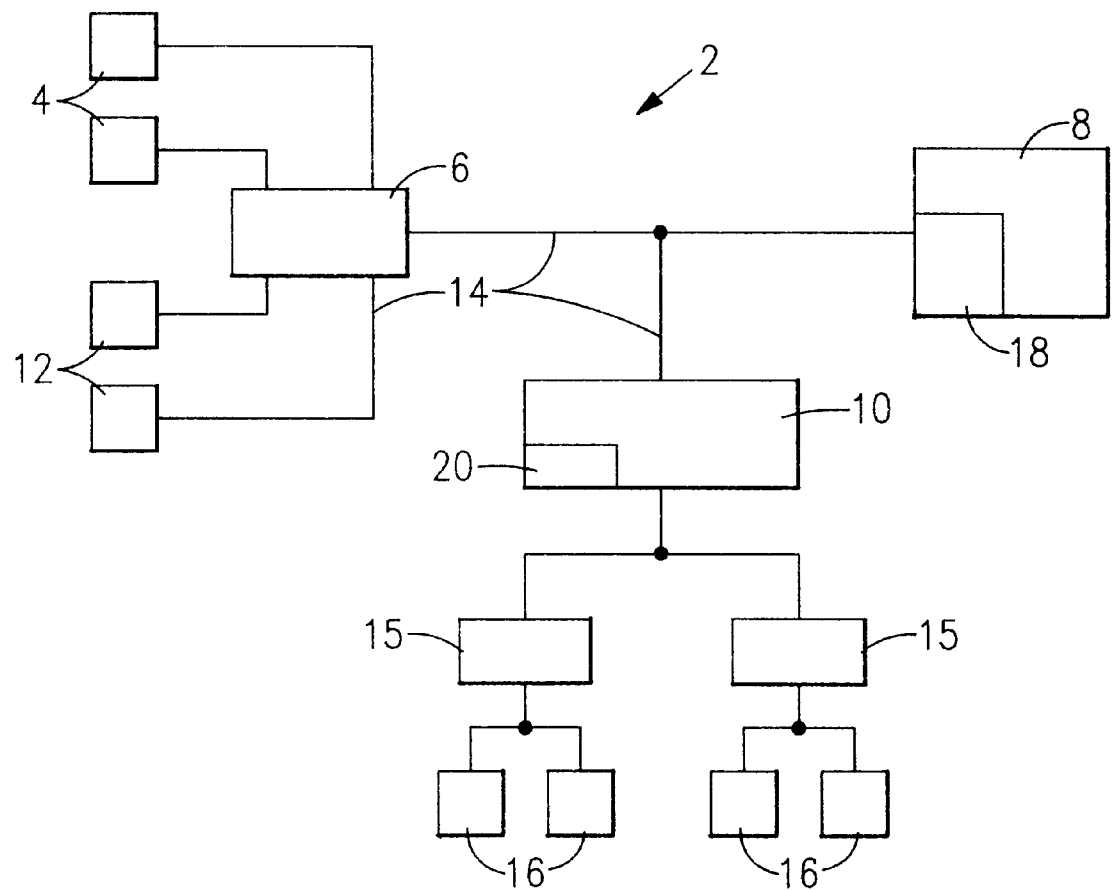
FIG. 1 schematically, the sequence of an I/O operation of a computer.

FIG. 1 shows schematically the sequence of an I/O operation by means of a computer system 2 with several processing units (PUs) 4, which communicate over a second level cache 6 with the memory 8 and an I/O adapter 10. First of all, one of the processing units 4, transmits the I/O task to a service assist processor (SAP) 12. On its own side, this SAP then sends over the computer internal bus system 14 and the I/O adapter 10, which the bus-side protocol has converted in an I/O protocol, over distribution channel chips 15 of a check-back instruction in the channel, a functional unit, which controls the data transfer between internal and peripheral units.

In the scope of the implementation of the channel programme stored in the memory, the provided Fetch- and Store-Operations are sent to the memory 8 from one of the corresponding channel chips 16. Data from the memory was requested with the help of a Fetch-Operation, which were then transmitted together with a response to the channel chip. In exchange, data from the channel chip was sent to the memory at the Store-Operation, and stored there, as a result of which the memory sent a Status-Response to the channel chip.

In this manner, little by little the whole channel programme 18 is processed, and the whole data exchange therefore takes place between peripheral equipment and memory, with the help of the channel programme.

In the moment in which the channel programme is completely processed, the channel sends a termination registration as Store-Operation to the memory. A channel assigned Register bit 20 is set in the I/O adapter 10 with the help of a check operation which the channel chip 16 sends to the to the I/O adapter as a result.

As the status has altered on the I/O adapter connected peripheral equipment (this status represented through the Register bits in the I/O adapter), the I/O adapter sends an interruption to the responsible SAP. This then recognizes the resulting status alteration with the help of a Sense command in the I/O adapter.

In conclusion through the peripheral access carried out by the SAP, the SAP sends an interrupt to that PU which had initiated the exchange with the periphery.

Figure 2:
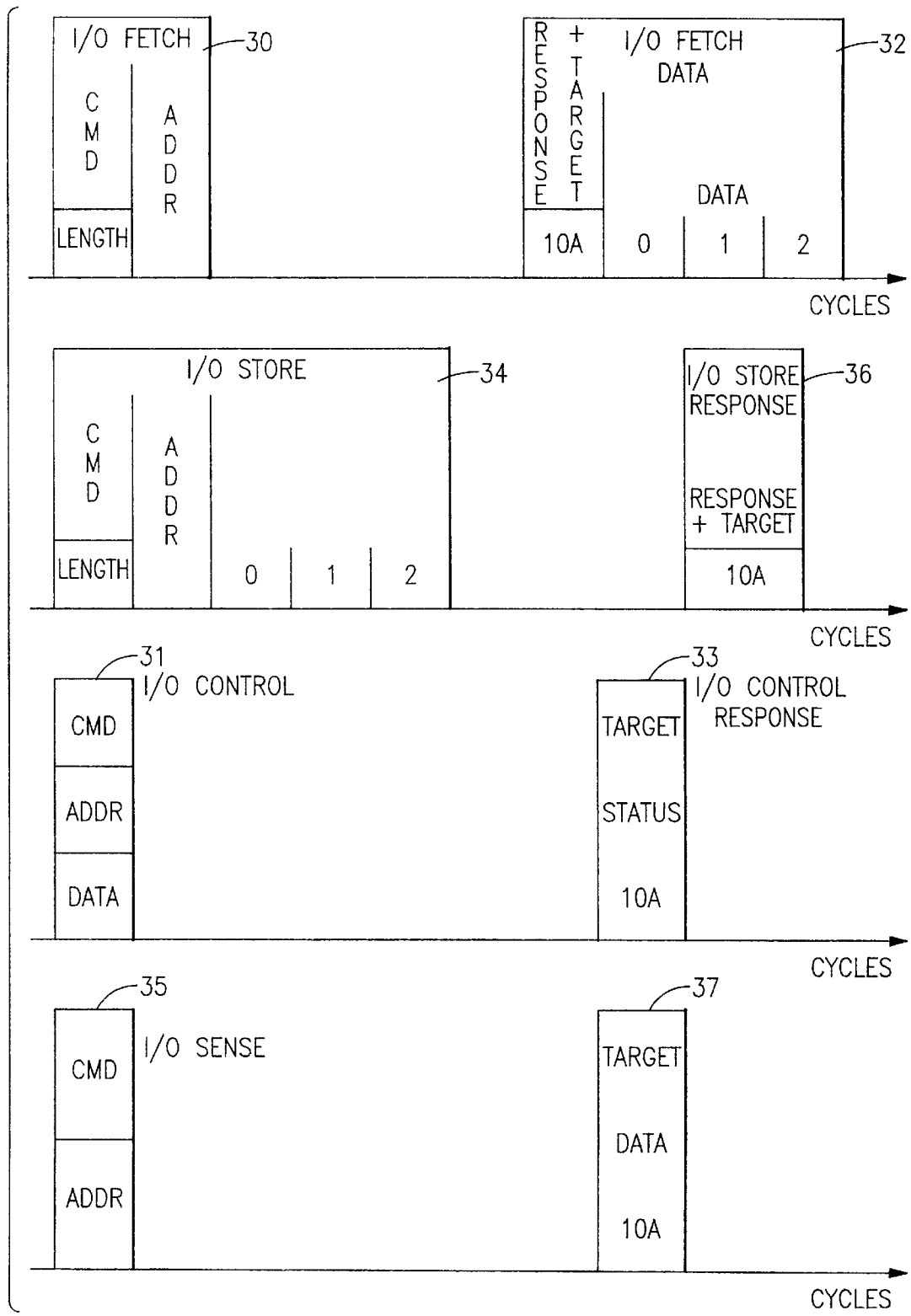
FIG. 2 a diagram of exchanged commands and data in this operation.

The structure for the data exchange between channel chip and memory fundamental commands, is again represented in FIG. 2.

In the first cycle of the I/O Fetch-command 30, the command (Command, CMD) itself as well as the length of the data packet to be transferred from the memory to the channel chip is given. In the second cycle of the I/O Fetch-command, the start address in memory (ADDR) is transferred, as it represents the beginning of the data packet to be transmitted.

This command is always transmitted from the channel chip to the memory. The memory replies to this with a re-transmission of a response 32, which also contains the requested data. The type of response is transmitted in the first cycle of this response (in this case it deals with a response to a Fetch-command), and in addition, the target is given, i.e. the address of the receiver (channel chip) where the required data is to be delivered. It is also specified in this first cycle, over which I/O adapter the data transfer should run (IOA).

The data itself is transmitted in the following cycles, and the length of the attached data packet thereby corresponds to the specified length of the I/O Fetch-command.

Data from the memory can therefore be read by the Fetch-command, and stored in the periphery.

On the other hand, should data emerging from the periphery be written in the memory, then the channel chip sends an I/O-Store command 34 to the memory. The command-type (CMD, here I/O-Store) is again specified in the first cycle of this command, and additionally the length of the transmitted data is given.

The target address in memory (ADDR) is specified in the second cycle, from which the incoming data should be written in the memory, and the corresponding data itself follows in the next cycles.

The arrival of this I/O Store-command and the corresponding data are acknowledged by an I/O-Store response 36, which the memory sends to the initiated channel chip.

Should only short check-information be exchanged between channel and I/O adapter (and no larger data packet), then usually short, quick I/O-check operations are carried out. In the course of this, a compact 1-cyclic I/O-check command 31 is sent, which contains the command as well as the receiver address, and also a limited quantity of check data.

The receiver acknowledges after receipt and implementation with a short response 33, which again contains the return address/target, IOA-address, as well as essential elements of the execution status.

Should the channel interrogate only short information from the I/O adapter, (e.g. the time) or should the I/O adapter interrogate short information from the channel ( e.g. its condition), then for this purpose one uses a short I/O sense operation, which also transmits the command and target address in one cycle. The response 37 then again contains the return address/target, IOA-address, as well as the desired sense-data.

This I/O-sense and also the I/O check are extensively symmetrical in both directions, but transport different user data.

The problem has been set in the following described computer system, on how to re-arrange the fast protocol delivered by the computer system, with the intermediate switching of a protocol converter in an existing, conventional (and also slow) I/O protocol. In this way, the data structure of the one protocol is converted into the other protocol.

Figure 3:
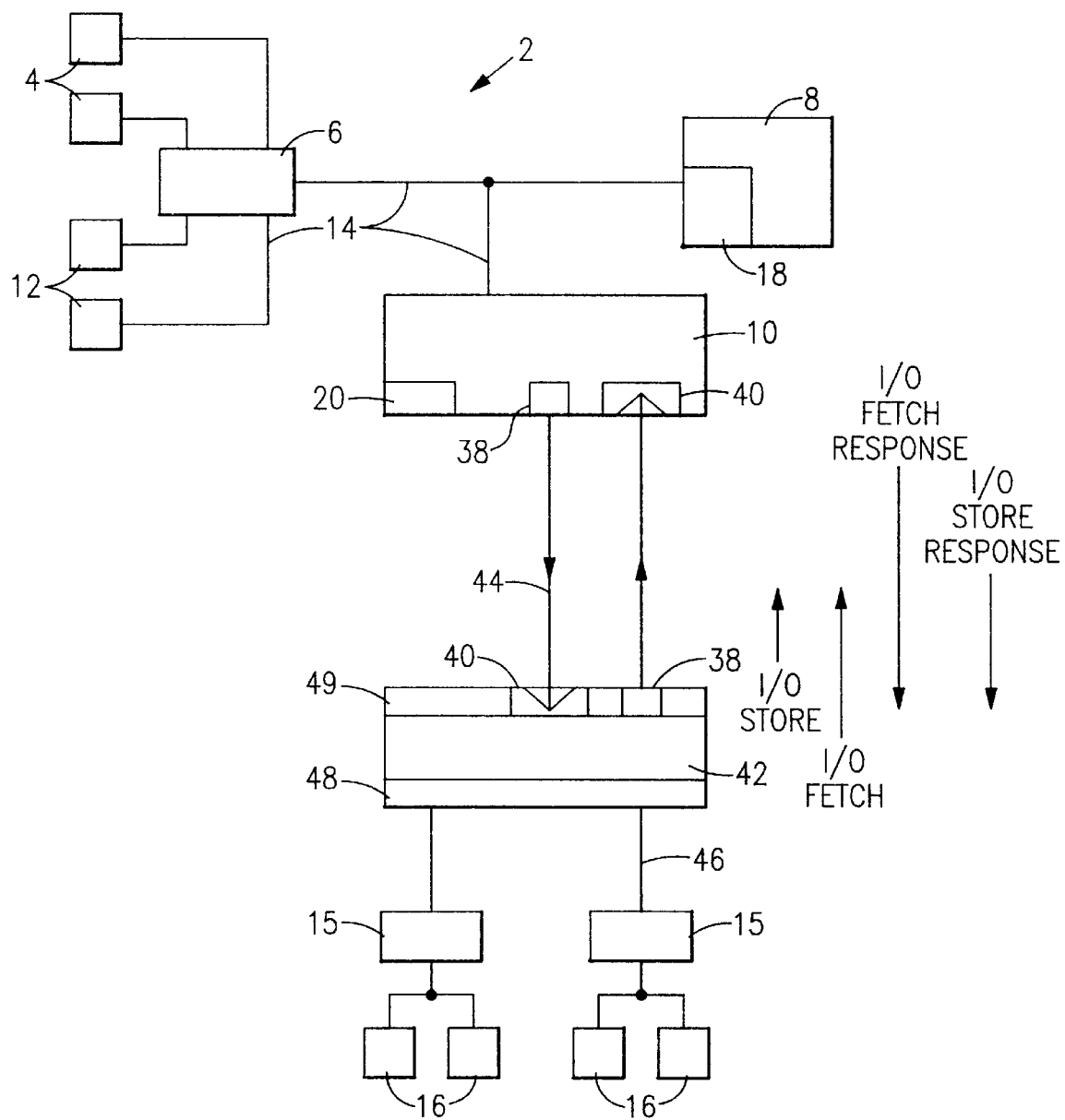
FIG. 3 the sequence of an I/O operation with intermediate switching of a protocol converter, FIG. 4 a test arrangement to test a protocol converter, FIG. 5 a test arrangement with two protocol converters operating in normal mode, FIG. 6 a test arrangement according to the invention, by which a protocol converter in normal mode, operates with one in Bringup mode, FIG. 7 schematically, the deactivation of the selection means and FIG. 8 the application of the protocol converter according to the invention on a simulation level.

Basically it can deal with the fast I/O protocol in any desired protocol, but in the submitted example (FIG. 3) the fast Self-Timed-Interface (STI)-protocol should be taken into consideration.

For this purpose, the necessary send- and receive macros 38, 40, as well as the I/O adapter side 10 are available, as well as the side of the protocol converter 42.

The protocol converter then has the task of converting this fast protocol 44 into the slower protocol 46, also with the intermediate switching of storage means. The slower protocol is made available by the protocol converter over a special interface 48, on to which the channel distribution chips 15 and the channel chips 16 are connected, and coupled with the peripheral equipment. It is clear from FIG. 3, that the protocol converter in the present example does not carry out any symmetrical conversion of the command set, because not only the I/O Store- but also the I/O Fetch- command must always be translated from the side of the slow protocol 46 to the side of the fast protocol 44, whilst the related responses are reversed and correspondingly must be converted from the side of the fast protocol into the slow protocol.

In order to guarantee a greater safety of data, additional selection circuits must therefore be incorporated in the protocol converter, in order to make impossible a conversion as well as the I/O-Store- and also I/O Fetch commands from the side of the fast protocol to the side of the slow protocol from the start. Just the same, these circuits prevent the related responses from the side of the slow protocol being converted into the fast protocol.

In order to ensure the correct functionality of data exchange with the peripherals, a test of the protocol converter chips is important, so as to enable the use of a fast protocol processed by the protocol converter.

In order to be able to carry out a test of the protocol converter hardware, independently of the fast protocol of the computer system made available, it is necessary to construct a chip which makes the quick protocol available (Bringup-chip).

Figure 4:
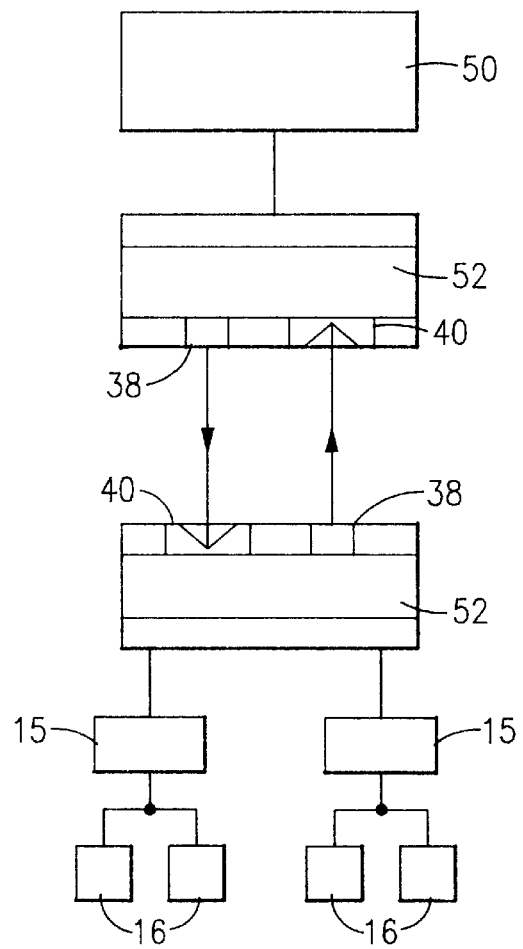

A test arrangement for testing the protocol converter is possible with the help of these chips according to FIG. 4.

A computer system 50 which has the slow protocol available is coupled with the Bringup-chip 52 for this purpose, which converts the delivered test data into the fast protocol.

The test data converted into the fast protocol are then fed over corresponding send- and receive macros 38, 40 into the protocol converter 54 to be tested, which is directly coupled with the peripherals.

In case programmes which are running in the (conventional) computer system, and whose task it is to prepare a data exchange with peripheral equipment, also lead to a correct data exchange with the peripherals in the submitted test arrangement, then a correct protocol conversion can be concluded through the converter 54.

It seems likely that the protocol converter itself can be used as a Bringup-chip, as it has not only an interface 48 to the slower conventional protocol, but also an interface 49 to the fast protocol.

Figure 5:
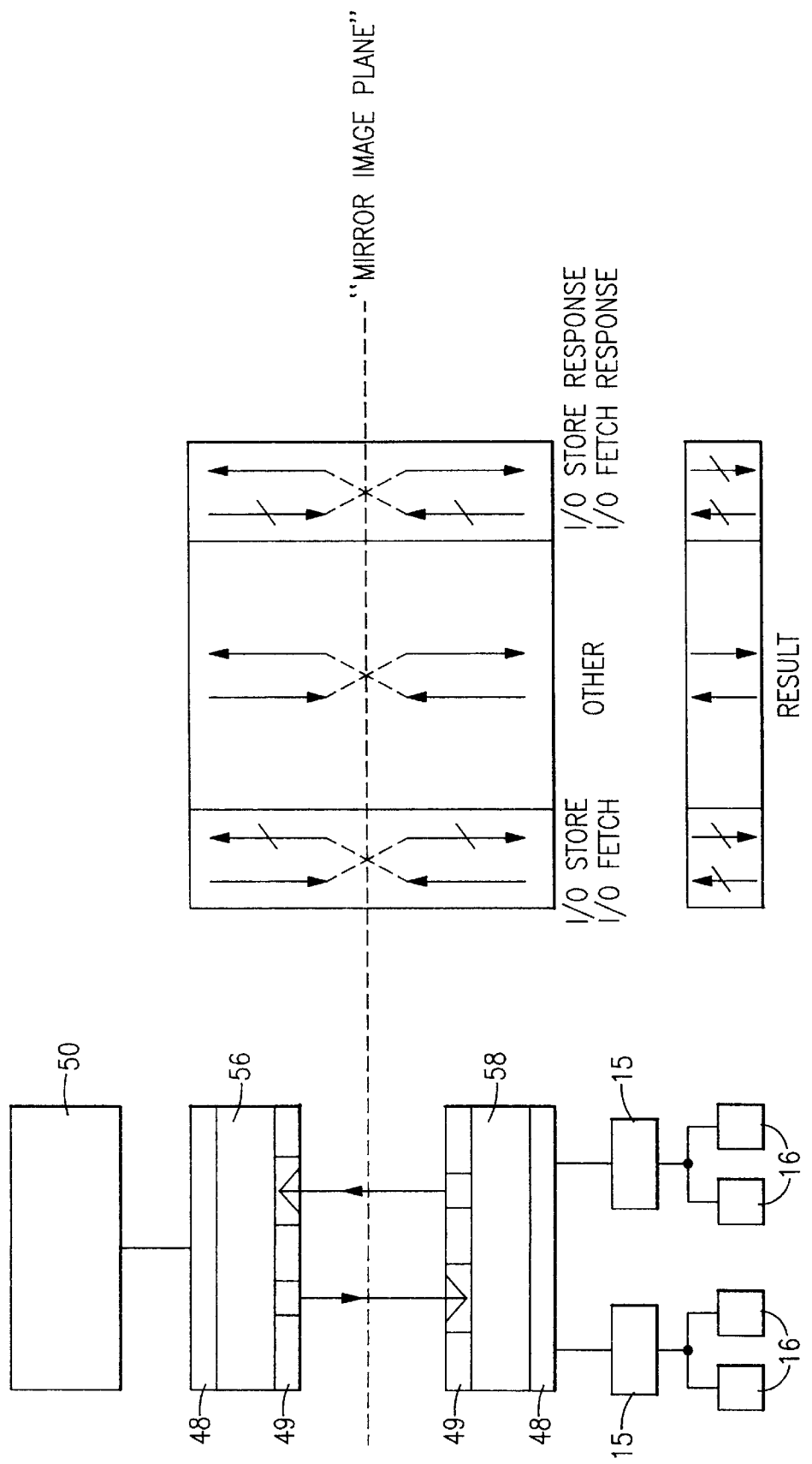

FIG. 5 shows an arrangement of this kind, by which the conventional protocol delivered by the computer system 50, is translated with an initial protocol converter 56 operated in normal mode, into the fast protocol, which then on its own side is re-converted over a second protocol converter 58 likewise operating in normal mode, into the I/O protocol, so that the second protocol converter which has the slow protocol occurring interface 48 can be coupled with the peripherals.

By this "mirror image" coupling of both protocol converters however, the following problem arises:

I/O-store and I/O-fetch commands which are sent out by the peripherals indeed have to pass the second protocol converter 58, but are however masked out by the selection circuit of the first protocol converter 56, which should be used for Bringup. Exactly the same problem occurs in respect of the responses, the I/O-store-response and the I/O-fetch response, as represented in FIG. 5. These responses have to pass the second protocol converter 58 only in the direction of the fast protocol to the peripherals.

If such responses are however transmitted from the memory of the computer, then in order to reach the second protocol converter, they must pass the first protocol converter used for Bringup. They must be able to be transmitted for this purpose in the normal mode operating protocol converter 56 from the side of the slow protocol, to the side of the fast protocol, and this is expressly forbidden.

On these grounds it is not possible with a selection circuit of only non-directional transmission of I/O store, I/O-fetch and corresponding responses equipped protocol converter 56, to use it for Bringup purposes, as all named commands and responses of both "mirror image" opposing wired up protocol converters, are suppressed by the selection circuit of the first protocol converter.

It is therefore necessary to suppress the selection means in the first protocol converter, in order to obtain a complete Bringup.

Figure 6:
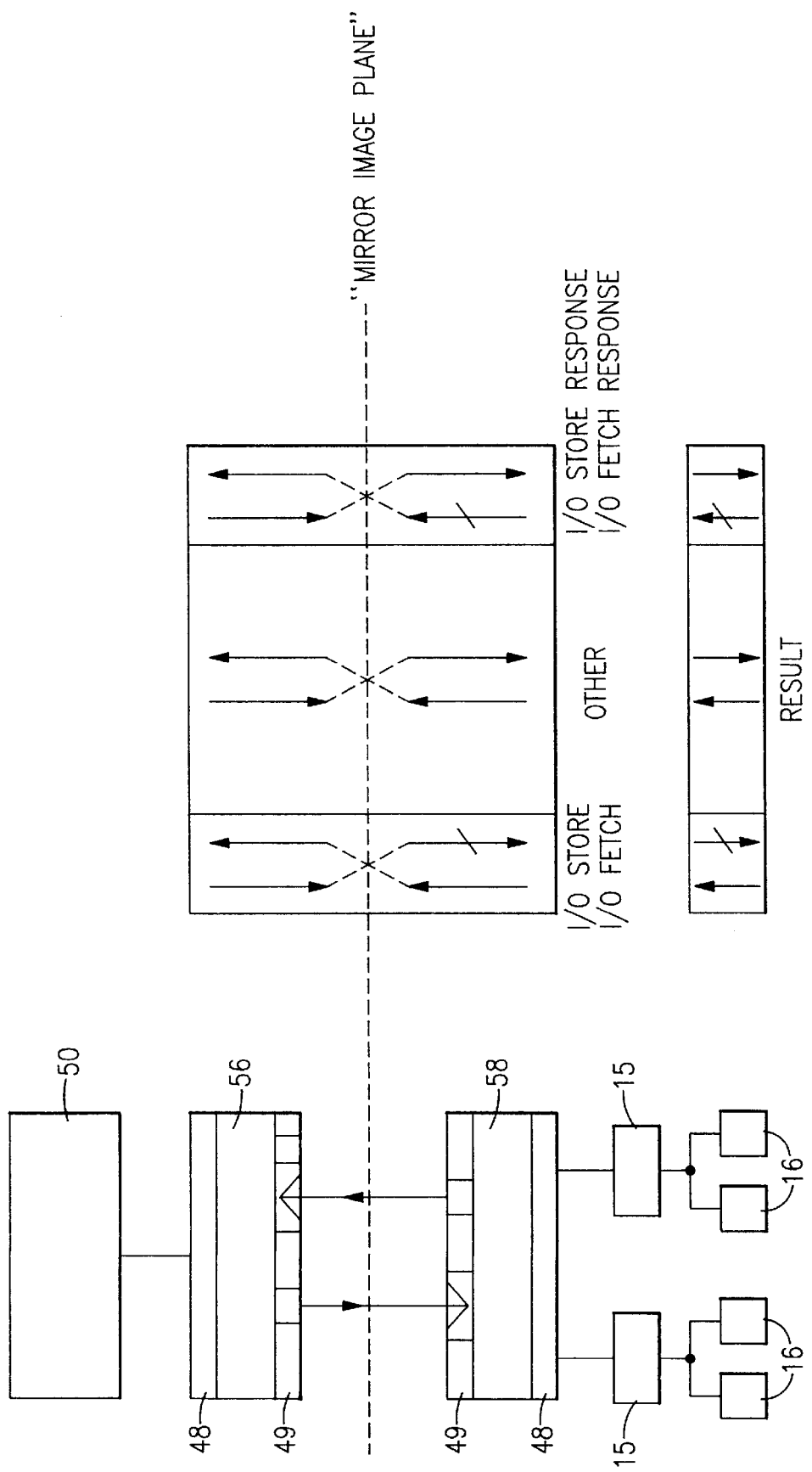

This solution according to the invention, is represented in FIG. 6. The first protocol converter 56 is here inserted in Bringup mode, which means that those commands and responses which actually had to pass the converter in one direction, can now be transmitted in both directions.

The arrangement to test the times of protocol converters 58 operating in normal mode, must therefore have the following construction:

The computer system 50 is connected over its slow protocol with the first protocol converter 56 in Bringup mode, which on its side is connected over its quick protocol related interface, with the protocol converter 58 to be tested.

The peripherals are coupled on the interface 48 relating to the conventional protocol of the second protocol converter 58.

A regular data exchange is possible between the computer system and the peripherals by this test arrangement, as not only the I/O-store and the I/O-fetch commands can come from the peripherals to the computer system, but also the corresponding responses from the computer system to the peripherals. This result is only possible by the deactivation of the selection circuit of the first protocol converter, as shown in FIG. 6

Thereby a complete test of the interaction between computer system and peripherals is possible. The "mirror image" combination of the protocol converter operating in Bringup mode with the one operating in normal mode, presents no problems owing to the equivalence of both to connected interfaces.

The test of converting all commands and data into the fast protocol can be carried out completely, whereby the fast protocol is used at its original speed on the transfer channel between both protocol converters.

Figure 7:
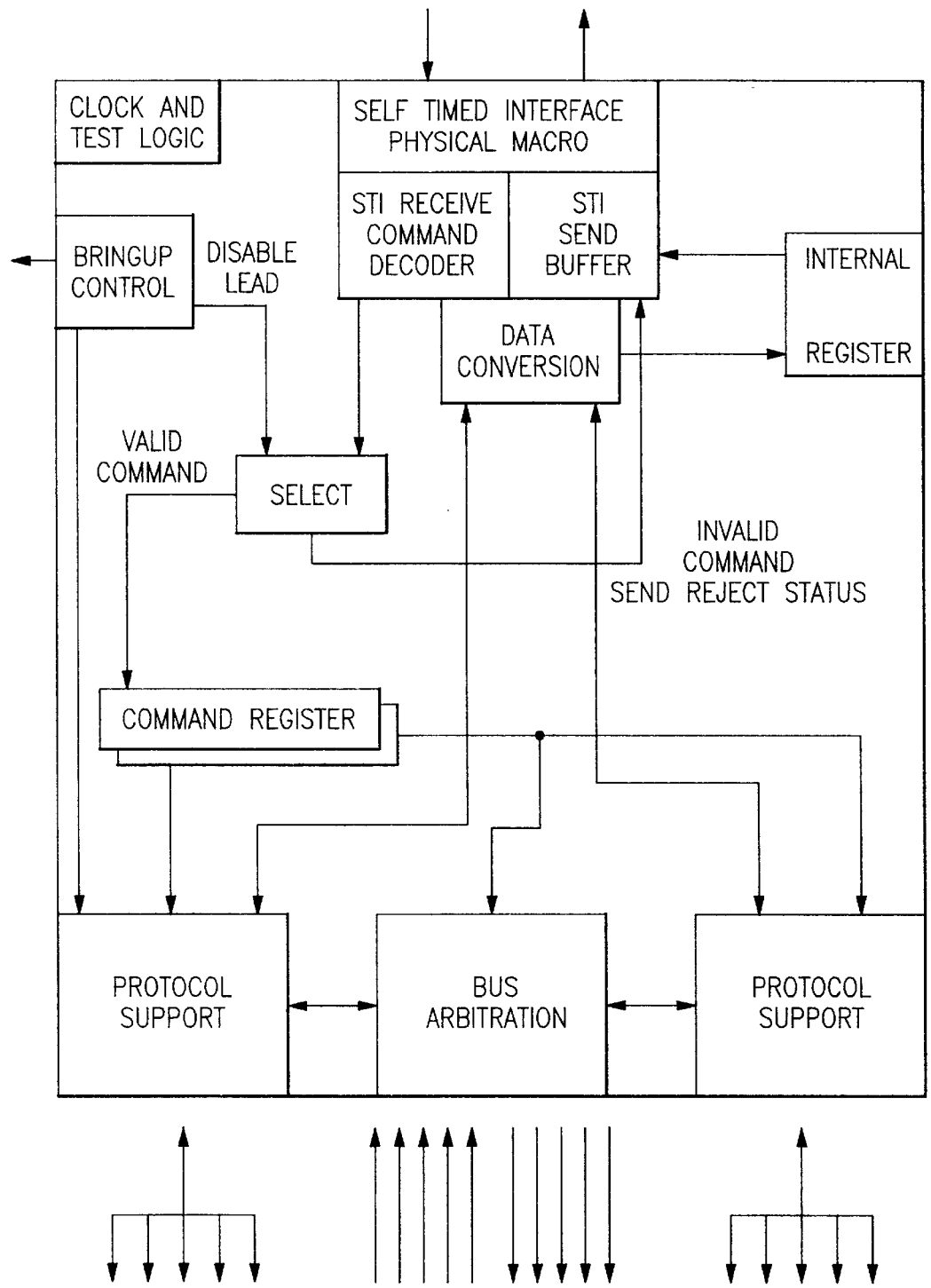

In FIG. 7 is represented how it can be disconnected according to the receiving side macro occurring on the fast protocol interface, by means of a disabling lead of the selection circuit which serves to suppress unwanted commands. FIG. 7 shows how the Bringup control logic checks whether a received command is valid in this operational mode, and only in this case will the command or operation be passed on to the slower protocol. All commands in Bringup mode are allowed through, and in normal operation the commands not used here are rejected, and the sending side induced to respond with a reject-status.

Instead of the data to be transmitted reaching the peripherals through a real computer system, and to couple over the interface relating to the conventional protocol in the Bringup mode operated protocol converter, it is also possible to generate it by means of a simulation test data in a conventional protocol, which can then be fed into the conventional interface occurring side of the protocol converter in Bringup mode, and can be transferred to the peripherals.

Instead of a test of the functionality with classic I/O devices which are coupled to the protocol converter in normal mode, test programmes can be used which can be coupled with the conventional protocol related interface of the protocol converter in normal mode.

Figure 8:
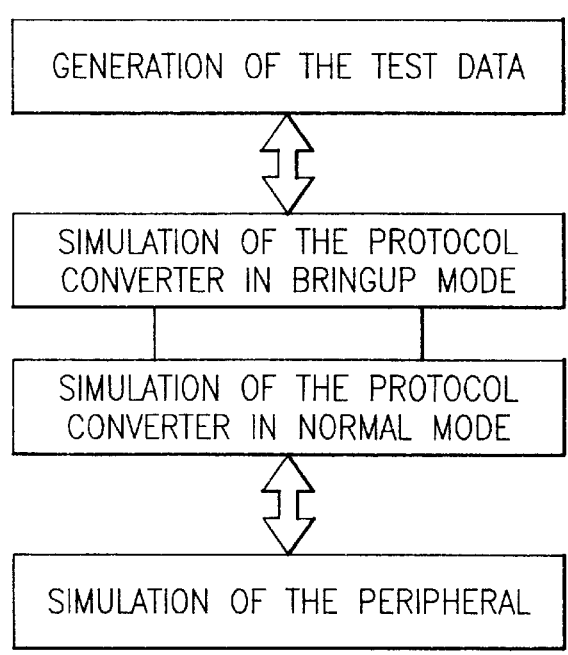

The principle of testing a protocol converter in normal mode, is that it is coupled with a "mirror image" of a second identical protocol converter operating in Bringup mode, and can be used on a simulation level (FIG. 8).

In order to generate the hardware of the protocol converter chips, it is necessary to prepare a simulation of the protocol converter chips capable of running on a computer. A test of the protocol converter chips on a simulation level can then be carried out, so that the fast protocol related In-/Output of a first protocol converter in Bringup mode operated simulation of the protocol converter, is coupled with the In-/Output of a second protocol converter operating in normal mode simulation. This occurs by the combination structure between both fast interfaces being specified. For this purpose it is established in a wiring list, how and in which type and manner both simulations can be coupled with each other.

Test data in the slow protocol must be fed into the related interface of the slow protocol of the protocol converter simulation in Bringup mode; in addition, test programmes are necessary which simulate the peripheries, with which to combine with the slow protocol related interface of the protocol converter simulation operating in normal mode.

A complete test of functionality of the protocol converter on a simulation level is possible in this manner; specific errors which occur through the high speed of the fast protocol on the transmission track between both protocol converters in real operation, can however not be detected in this manner.

We claim:

1. A method of testing a second protocol converter (58) with the help of an identical first protocol converter (56), whereby a protocol converter data structure is converted from a protocol A in a corresponding data structure, into a protocol B, and whereby an asymmetry in a protocol conversion exists, in such a manner, that selection means in the second or identical first protocol converter prevents a conversion of a quantity M of data structure from the protocol A into the protocol B, and/or a quantity M of data structure from the protocol B into the protocol A, characterized by the following steps:

a) deactivating of the selection means in the first protocol converter (56), whereby a balancing of the protocol conversion in the first protocol converter is achieved, b) combining of both protocol converters over their corresponding related In/Out to the protocol B, and c) feeding and reading of tests data structures over the corresponding related In/Out to the protocol A of the identical first (56) and second (58) protocol converters.

2. A method according to claim 1, characterized in that through the protocol to be converted through the second and identical first protocol converters, it relates to the I/O protocol of a computer system.

3. A method according to claim 2, characterized in that the quantity N of data structure, whose conversion from the protocol B into the protocol A is prevented by the selection means, includes the commands I/O-fetch and I/O-store.

4. A method according to claim 2, characterized in that the quantity M of data structure, whose conversion from the protocol A into the protocol B is prevented by the selection means, includes the responses to the commands I/O-fetch and I/O-store.

5. A method according to claim 1, characterized in that the selection means includes a disabling lead.

6. A method according to claim 1, characterized in that deactivating of the selection means is contrived with the help of a disabling lead.

7. A method according to claim 1, characterized in that it relates to a quick protocol B about a self-timed-interface (STI)-protocol.

8. A method according to claim 1, characterized in that a real computer system and real I/O devices are used for the test.

9. A method according to claim 1, characterized in that the test data in the protocol A was achieved by simulation.

10. A method according to claim 1, characterized in that a test program to simulate I/O devices was used.

11. A method according to claim 1, characterized in that the test was carried out completely on a simulation level.

\* \* \* \* \*